United States Patent [19]

Cavitt et al.

[11] Patent Number: 4,552,814

[45] Date of Patent: Nov. 12, 1985

[54] ADVANCED EPOXY RESINS HAVING IMPROVED IMPACT RESISTANCE WHEN CURED

[75] Inventors: Michael B. Cavitt; Neal L. Wassberg, both of Lake Jackson, Tex.

[73] Assignee: The Dow Chemical Company, Midland, Mich.

[21] Appl. No.: 696,673

[22] Filed: Jan. 30, 1985

Related U.S. Application Data

[63] Continuation-in-part of Ser. No. 612,287, May 21, 1984, abandoned.

[51] Int. Cl.$^4$ ............... C08G 59/14; C08G 59/62
[52] U.S. Cl. ............... 428/414; 525/482; 525/484; 525/528; 528/45; 528/93; 528/94; 528/98; 528/103; 528/104; 528/89
[58] Field of Search ............... 528/103, 104, 89, 93, 528/94, 98, 45; 525/482, 484, 528; 428/414

[56] References Cited

U.S. PATENT DOCUMENTS

| | | | |
|---|---|---|---|
| 3,016,362 | 1/1962 | Wismer | 528/103 X |
| 3,240,376 | 3/1966 | Smith et al. | 528/103 X |
| 3,336,257 | 8/1967 | Alvey | 260/47 |
| 3,346,532 | 10/1967 | Greene et al. | 260/37 |
| 3,350,353 | 10/1967 | Alvey | 260/47 |
| 3,367,990 | 2/1968 | Bremmer | 525/482 |
| 3,725,341 | 4/1973 | Rogers et al. | 528/104 X |
| 3,931,109 | 1/1976 | Martin | 528/104 X |
| 4,342,673 | 8/1982 | Wolfrey | 528/103 X |
| 4,440,914 | 4/1984 | Melfand et al. | 525/482 |
| 4,465,722 | 8/1984 | Fiaux et al. | 528/103 X |

FOREIGN PATENT DOCUMENTS 042298 4/1978 Japan.

*Primary Examiner*—Earl Nielsen
*Attorney, Agent, or Firm*—J. G. Carter

[57] ABSTRACT

Epoxy resins are prepared by reacting a mixture of (A) a diglycidyl ether of a dihydric aliphatic material, (B) a polyglycidyl ether of a polyhydric phenol having an average of at least about 2.6 glycidyl ether groups per molecule and optionally (C) a diglycidyl ether of a dihydric phenol with a dihydric phenol in the presence of a catalyst.

Coating compositions containing the aforementioned epoxy resins have improved chip resistance, chemical resistance or pencil hardness when cured.

18 Claims, No Drawings

ADVANCED EPOXY RESINS HAVING IMPROVED IMPACT RESISTANCE WHEN CURED

CROSS REFERENCE TO RELATED APPLICATION

This is a continuation-in-part of copending application Ser. No. 612,287 filed May 21, 1984, now abandoned.

BACKGROUND OF THE INVENTION

The present invention pertains to advanced epoxy resins and high solids coatings prepared therefrom.

In the manufacture of automobiles, it is desirable to provide the metal with a protective coating that is chip resistant. The present invention provides an epoxy resin which can be formulated into a coating composition which provides excellent chip resistance to the substrate and improved chemical resistance.

SUMMARY OF THE INVENTION

One aspect of the present invention pertains to an advanced epoxy resin composition comprising the product resulting from reacting (A) a mixture containing (1) at least one polyglycidyl ether of a material having at least two aliphatic hydroxyl groups per molecule, (2) at least one epoxy resin having an average of at least about 2.6, preferably from about 2.8 to about 6, most preferably from about 3 to about 4 glycidyl ether groups per molecule attached to at least one aromatic ring and optionally (3) one or more glycidyl ethers of a dihydric phenol; with (B) at least one dihydric phenol in the presence of a suitable quantity of a suitable catalyst; and wherein components (A) and (B) are present in quantities which provide an epoxy to phenolic hydroxyl ratio of from about 1.4:1 to about 4:1, preferably from about 1.8:1 to about 2.5:1 and wherein the number of epoxy equivalents contributed by component (A-3) to the number of epoxy equivalents contributed by component (A-2) to the number of epoxy equivalents contributed by component (A-1) is from about 0:0.05:1 to 0.3:0.6:1, preferably from about 0:0.08:1 to about 0.15:0.56:1, most preferably from about 0:0.1:1 to about 0.1:0.45:1.

The quantity of component (A-2) which can be employed herein without forming a gel depends upon its functionality. The greater the functionality, the lesser the quantity that can be employed without forming a gel. Small quantities of components at a desired ratio of components (A-1) and (A-2) can be easily conducted to determine if that particular ratio will form a gel. If it does, the ratio can be changed and other small scale experiments can be conducted until a ratio which does not form a gel is determined.

Usually, when component (A-2) has an average epoxide functionality of from about 2.6 to about 3, the ratio of epoxy equivalents contributed by component (A-3) to epoxy equivalents contributed by component (A-2) to epoxy equivalents contributed by component (A-1) is from about 0:0.2:1 to about 0.3:0.45:1, preferably from about 0:0.3:1 to about 0.15:0.56:1, most preferably from about 0:0.4:1 to about 0.1:0.58:1 and the ratio of total epoxy equivalents contributed by component (A) to phenolic hydroxyl equivalents contributed by component (B) is from about 1.4:1 to about 4:1, preferably from about 1.59:1 to about 3:1, most preferably from about 1.9:1 to about 2.5:1.

Usually, when component (A-2) has an average epoxide functionality of from about >3 to about 3.6, the ratio of epoxy equivalents contributed by component (A-3) to epoxy equivalents contributed by component (A-2) to epoxy equivalents contributed by component (A-1) is from about 0:0.12:1 to about 0.3:0.31:1, preferably from about 0:0.2:1 to about 0.15:0.41:1, most preferably from about 0:0.3:1 to about 0.1:0.43:1 and the ratio of total epoxy equivalents contributed by component (A) to phenolic hydroxyl equivalents contributed by component (B) is from about 1.4:1 to about 4:1, preferably from about 1.59:1 to about 3:1, most preferably from about 1.9:1 to about 2.5:1.

Usually, when component (A-2) has an average epoxide functionality of from about >3.6 to about 6, the ratio of epoxy equivalents contributed by component (A-3) to epoxy equivalents contributed by component (A-2) to epoxy equivalents contributed by component (A-1) is from about 0:0.05:1 to about 0.3:0.1:1, preferably from about 0:0.08:1 to about 0.15:0.12:1, most preferably from about 0:0.1:1 to about 0.1:0.13:1 and the ratio of total epoxy equivalents contributed by component (A) to phenolic hydroxyl equivalents contributed by component (B) is from about 1.4:1 to abut 5:1, preferably from about 1.59:1 to about 4:1, most preferably from about 1.9:1 to about 3:1.

By the term polyglycidyl ether, it means that the material contains an average of more than one glycidyl ether group per molecule.

Another aspect of the present invention pertains to coatings prepared from the aforementioned advanced epoxy resins.

A further aspect of the present invention pertains to products resulting from curing a mixture of the aforementioned advanced epoxy resin and a curing quantity of at least one suitable curing agent therefor.

DETAILED DESCRIPTION OF THE INVENTION

Suitable glycidyl ethers of a material having at least two aliphatic hydroxyl groups include, for example, the glycidyl ethers of ethylene glycol, propylene glycol, dipropylene glycol, tripropylene glycol, 1,4-butanediol, 1,6-hexanediol, polyoxypropylene glycol, polyoxyethylene glycol, polyoxybutylene glycol, glycerine, 1,2,3-trihydroxybutane, 1,2,4-trihydroxybutane, trimethylolpropane, diglycidyl ether of hydrogenated bisphenol A, diglycidyl ether of cyclohexane dimethanol, mixtures thereof and the like.

Suitable epoxy resins having an average of from about 2.6 to about 6 glycidyl ether groups attached to an aromatic ring include those represented by the formulas

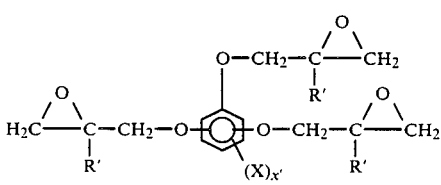

FORMULA I

FORMULA II

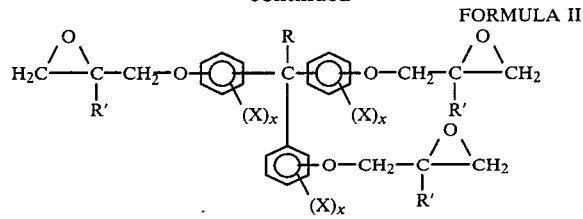

FORMULA III

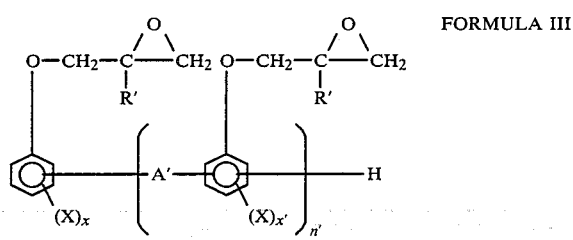

wherein each A' is independently a divalent hydrocarbyl group having from 1 to about 10 carbon atoms; R is hydrogen or a hydrocarbyl group having from 1 to about 10 carbon atoms; each R' is independently hydrogen or a hydrocarbyl group having from 1 to about 4 carbon atoms; each X is independently hydrogen, a monovalent hydrocarbyl group having from 1 to about 10 carbon atoms or a halogen; n' has a value of from about 1.6 to about 5, preferably from about 2 to about 3; x has a value of 4 and x' has a value of 3.

Suitable glycidyl ethers of a dihydric phenol which can be employed herein include those represented by the formulas

FORMULA IV

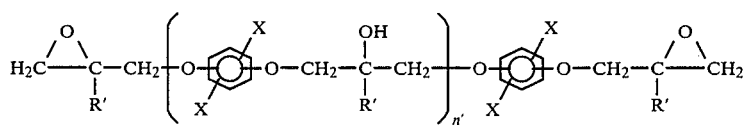

FORMULA V

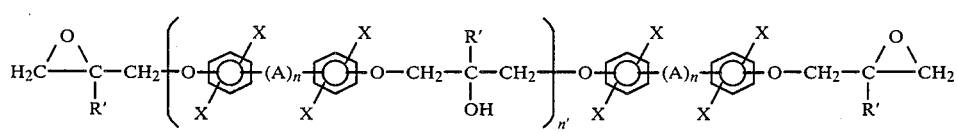

wherein each A is independently a divalent hydrocarbyl group having from 1 to about 10 carbon atoms, $$-O-, -S-, -S-S-, -\overset{O}{\underset{}{S}}-, -\overset{O}{\underset{O}{S}}-,$$

$$-\overset{O}{\underset{}{C}}- \text{ or } -O-\overset{O}{\underset{}{C}}-O;$$

each X is independently hydrogen, a monovalent hydrocarbyl group having from 1 to about 10 carbon atoms or a halogen; and n has a value of zero or 1; and n' has a value from zero to about 1, preferably from zero to about 0.5.

Suitable materials having two hydroxyl groups attached to an aromatic ring which can be employed herein include those represented by the formula

FORMULA VI

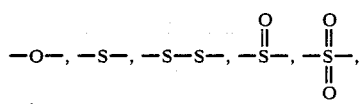

FORMULA VII

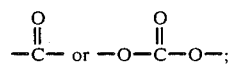

wherein A is a divalent hydrocarbyl group having from 1 to about 10 carbon atoms, $$-O-, -S-, -S-S-, -\overset{O}{\underset{}{S}}-, -\overset{O}{\underset{O}{S}}-,$$

$$-\overset{O}{\underset{}{C}}- \text{ or } -O-\overset{O}{\underset{}{C}}-O-;$$

each X is independently hydrogen, a monovalent hydrocarbyl group having from 1 to about 10 carbon atoms or a halogen; and m has a value of zero or 1.

Suitable catalysts which can be employed herein to influence the reaction between the epoxy group and the phenolic hydroxyl group include, for example, ammonium compounds, phosphonium compounds, tertiary amines, mixtures thereof and the like.

Suitable tertiary amines include, for example, diethylenetriamine, N-methylmorpholine, triethylamine, tributylamine, benzyldimethylamine, tris(dimethylaminomethyl)phenyl, mixtures thereof and the like.

Suitable phosphonium compounds include, for example, those disclosed by Dante et al. in U.S. Pat. No. 3,477,990, Perry in Canadian Patent No. 893,191 and U.S. Pat. No. 3,948,855 and by Tyler, Jr. et al. in U.S. Pat. No. 4,366,295 all of which are incorporated herein by reference.

Suitable ammonium compounds include, for example, benzyl trimethyl ammonium chloride, benzyl trimethyl ammonium hydroxide, tetrabutyl ammonium chloride, tetramethyl ammonium hydroxide, tetrabutyl ammonium hydroxide, mixtures thereof.

The quantity of catalyst varies from time to time, depending upon the conditions employed, but is usually from about 0.0003 to about 0.001, preferably from about 0.0005 to about 0.0008 moles of total catalyst per epoxide equivalent.

The temperature at which the epoxy component and the phenolic hydroxyl-containing component are reacted is usually from about 100° C. to about 210° C., preferably from about 160° C. to about 200° C.

Suitable curing agents include, for example, polyisocyanates, polyisothiocyanates, blocked isocyanates, blocked isothiocyanates, mixtures thereof as well as mixtures with guanidines and the like.

Suitable polyisocyanates include, for example, 2,4-toluenediisocyanate, 2,6-toluenediisocyanate, 4,4'-methylene diphenylisocyanate, hexamethylenediisocyanate, polymethylenepolyphenylisocyanate, biuret derivatives thereof, cyclic trimers and cocyclic trimers thereof, mixtures thereof and the like.

Suitable polyisothiocyanates include the thio derivatives of the aforementioned polyisocyanates.

Suitable blocked isocyanates and blocked isothiocyanates include, for example, the aforementioned polyisocyanates and polyisothiocyanates blocked with a suitable blocking agent such as a phenol, lactam, oxime, mixtures thereof and the like. Particularly suitable blocking agents include, for example phenol, 4-chlorophenol, o-sec-butylphenol, caprolactam, acetaldehydeoxime, methylethylketoxime, mixtures thereof and the like.

Suitable guanidines include, those represented by the formula

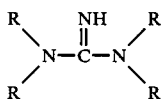

wherein each R is independently hydrogen or an alkyl group having from 1 to 4 carbon atoms, cyano or the group

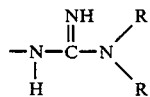

wherein R is as defined above.

Particularly suitable guanidines include, for example, guanidine, methylguanidine, dimethylguanidine, trimethylguanidine, tetramethylguanidine, methylisobiguanidine, dimethylisobiguanidine, trimethylisobiguanidine, tetramethylisobiguanidine, pentamethylisobiguanidine, hexamethylisobiguanidine, heptamethylisobiguanidine and cyanoguanidine.

The guanidine curing agent, when employed, is employed in quantities which provide a equivalent ratio of blocked isocyanate:guanidine:epoxy resin of from about 0.4:1 to 0.6:0.4 to 0.6:1.

The mixture of the advanced epoxy resin and the curing agent(s) is usually cured at temperatures of from about 120° C. to about 185° C., preferably from about 135° C. to about 165° C.

Suitable solvents which can be employed herein include, for example, ketones such as, for example, methyl isobutyl ketone, 2-heptanone, and the like, glycol ethers such as, for example, butylene glycol methyl ether, diethylene glycol n-butyl ether, diethylene glycol ethyl ether, diethylene glycol methyl ether, dipropylene glycol methyl ether, ethylene glycol n-butyl ether, ethylene glycol methyl ether, ethylene glycol phenyl ether, propylene glycol methyl ether, tripropylene glycol methyl ether; glycol esters such as, for example, ethylene glycol monoethyl ether acetate, ethylene glycol monobutyl ether acetate, ethylene glycol monomethyl ether acetate, propylene glycol monomethyl ether acetate, and the like; alcohols such as, for example, propanol, butanol, pentanol, and the like; and aromatic hydrocarbons such as, for example, toluene, xylene, mixtures thereof and the like.

The quantity of solvent which is employed is that quantity which is necessary to provide a suitable application viscosity.

The compositions of the present invention can also be mixed and/or cured in the presence of fillers, pigments, dyes, leveling agents, flow control agents, accelerators, fire retardant agents, modifiers, mixtures thereof and the like.

The compositions of the present invention can be employed in castings, coatings, moldings, adhesives, encapsulation, filament winding, flooring, structural laminates, electrical laminates, and the like.

The compositions of the present invention are particularly useful in the chip resistant coating employed in coating automobiles wherein the substrate, such as the automobile, is first coated with a corrosion resistant coating, next a chip resistant coating, next, optionally, a primer-surfacer coating and last a top coating.

The following examples are illustrative of the invention, but are not to be construed as to limiting the scope thereof in any manner.

The following components were employed in the example.

CATALYST A was a 70 weight percent solution of ethyl triphenyl phosphonium acetate.acetic acid complex in methanol.

EPOXY RESIN A was a diglycidyl ether of dipropylene glycol having an average epoxide equivalent weight (EEW) of about 194.

EPOXY RESIN B was a diglycidyl ether of dipropylene glycol having an average EEW of about 192.5.

EPOXY RESIN C was a phenol-formaldehyde novolac epoxy resin having an average epoxide functionality of about 3.6 and an average EEW of about 181.9.

EPOXY RESIN D was a phenol-formaldehyde novolac epoxy resin having an average epoxide functionality of about 3.6 and an average EEW of about 176.

EPOXY RESIN E was a diglycidyl ether of bisphenol A having an average EEW of about 187.5.

EPOXY RESIN F was a phenol-formaldehyde novolac epoxy resin having an average epoxide functionality of about 2.2 and an average EEW of about 176.9.

EPOXY RESIN G was a triglycidyl ether of trisphenol methane having an average EEW of about 160.4.

EPOXY RESIN H was a phenol-formaldehyde novolac epoxy resin having an average epoxide functionality of about 5.5 and an average EEW of about 188.6.

EPOXY RESIN I was a phenol-formaldehyde novolac epoxy resin made by mixing 171.2 g of Epoxy Resin F with 28.8 g of Epoxy Resin D to give an average epoxide functionality of about 2.4 and an average EEW of about 176.8.

EPOXY RESIN J was a phenol-formaldehyde novolac epoxy resin made by mixing 164.2 g of Epoxy Resin F with 65.8 g of Epoxy Resin D to give an average epoxide functionality of about 2.6 and an average EEW of about 176.7.

EPOXY RESIN K was a phenol-formaldehyde novolac epoxy resin made by mixing 114.0 g of Epoxy Resin F with 86.0 g of Epoxy Resin D to give an average epoxide functionality of about 2.8 and an average EEW of about 176.5.

EPOXY RESIN L was a diglycidyl ether of dipropylene glycol having an average EEW of about 191.

EPOXY RESIN M was a phenol-formaldehyde novolac epoxy resin having an average epoxy functionality of about 3.6 and an average EEW of about 180.

CURING AGENT A was a methyl ethyl ketoxime blocked polyisocyanate commercially available from Mobay Chemical Corporation as Desmodur KL5-2540.

COATING FORMULATION FILLER was prepared by dry mixing 300 g of ASP-400 clay, 100 g of $TiO_2$, 100 g of Barytes (from Pfizer), 15 g of red iron oxide and 1 g of National red from Sun Chemical.

COATING FORMULATION A was prepared by mixing 1 part epoxy resin solution, 1.06 parts Curing Agent A, 0.16 parts of a 20% solids solution of dibutyltin dilaurate catalyst in 2-heptanone, 1.6 parts of Coating Formulation Filler and enough butanol and 2-heptanone to obtain a sprayable viscosity but usually 0.3 parts n-butanol and 0.5 parts 2-heptanone. All parts were based on mass. The coating was cured at 300° F. (149° C.) for 15 minutes (900 s).

COATING FORMULATION B was prepared by mixing 1 part epoxy resin solution, 1.06 parts Curing Agent A, 0.16 parts of a 20% solids solution of dibutyltin dilaurate in n-butanol, 1.6 parts of Coating Formulation Filler and 0.75 parts of n-butanol. All parts were based on mass. The coating was cured at 300° F. (149° C.) for 15 minutes (900 s).

COATING FORMULATION C was prepared by mixing 1 part epoxy resin solution, 0.67 parts of dicyandiamide (5% N.V. in propylene glycol methyl ether), 0.032 part of 2-methylimidazole (10% N.V. in propylene glycol methyl ether), 0.5 part n-butanol and 0.85 part of Coating Formulation Filler. All parts were based on mass. The coating was cured at 300° F. (149° C.) for 15 minutes (900 s).

COATING FORMULATION D was prepared by mixing 1 part epoxy resin solution, 0.53 parts of Curing Agent A, 0.08 parts of a 20% solids solution of dibutyltin dilaurate catalyst, 0.34 parts of dicyandiamide (5% N.V. in propylene glycol methyl ether), 0.016 parts of 2-methylimidazole (10% N.V. in propylene glycol methyl ether), 0.5 parts of n-butanol and 1.3 parts of Coating Formulation Filler. All parts were based on mass. The coating was cured at 300° F. (149° C.) for 15 minutes (900 s).

COATING FORMULATION E was prepared by mixing 1 part by weight of epoxy resin solution, 1.06 parts Curing Agent A, 0.16 parts of a 20% solids solution of dibutyltin dilaurate in n-butanol and 0.37 parts of a n-butanol. All parts were based on mass. The coating formulations were applied to cold rolled steel panels with Bonderite ® 40 treatment (20 ga.) and coated using a number 26 draw down rod. The panels were cured for 15 min. (900 s) at 300° F. (149° C.).

STONE CHIP RESISTANT TEST

Panels used for evaluation were 20 ga. cold rolled steel with Bonderite ® 40 treatment. The panels were coated with four layers of paint as is typical of this performance evaluation test. The initial coating is a electrodepositable coating that is available from PPG Industries as UNI-PRIME ® ED 3150. This coating was cured at 350° F. (177° C.) for 30 minutes (1800 s). The next coating, applied on top of the UNI-PRIME coating, was the Coating Formulation being tested which was cured as indicated. The third coating was a primer coating available from the Ford Motor Company, Industrial and Chemical Products Division as 6J119B. This coat was cured for 20 min. (1200 s) at 300° F. (149° C.). The fourth and last coating was an enamel top coat available from Ford Motor Company, Industrial and Chemical Products Division as 50J107AN and was white in color. This appearance coat was baked at 275° F. (135° C.) for 15 minutes (900 s).

Evaluation of the above test panels was accomplished by measuring the stone chip resistance. This test method is described in Society of Automotive Engineers (SAE) Test Method J400 which is incorporated herein by reference.

MEK DOUBLE RUBS

To the ball end of a 2 lb. ball pein hammer was attached a pad of cheese cloth composed of 8 plys. The pad was saturated with methyl ethyl ketone (MEK) and then rubbed across a coated substrate. A constant back and forth motion is used allowing only the weight of the hammer to apply the force to the test panel. One double rub is equal to one back and forth movement. This movement is maintained until the film is marred and/or begins to be removed by the solvent.

GLACIAL ACETIC ACID SPOT TEST

To a coated substrate (cold rolled steel) is applied glacial acetic acid (~2 ml) then covered with a 2 oz. bottle. A timer is started when the acetic acid is applied and is continued until the coating delaminates. When delamination begins the timer is stopped.

PENCIL HARDNESS

This procedure is described in *Paint Testing Manual* by H. A. Gardner and G. G. Sward in the 13th Edition (1972), pages 283 and 284 which is incorporated herein by reference. When the coating is broken to the metal surface, that constitutes a failure. The results reported here are a pencil hardness that does not break the film but the next harder pencil grade does break the film. The pencil hardness rating, going from poorest to best, are 6B, 5B, 4B, 3B, 2B, B, HB, F, H, 2H, 3H, 4H, 5H and 6H. This test was run on 20 guage cold rolled steel panels with Bonderite ® 40 treatment. The coating was applied on the bare metal surface using Coating Formulation B and cured as stated above.

COMPARATIVE EXPERIMENT A

To a 1-liter glass flask equipped with a stirrer, thermometer, condenser, a method for a nitrogen purge and an electrical heating mantel was charged, in order, with 385.6 g (2.003 epoxy equivalents) of Epoxy Resin B, 114.4 g (1.004 equiv.) of bisphenol A and then heated to 90° C. whereupon 0.92 g (0.0016 mole) of Catalyst A was added. A nitrogen purge was maintained for the duration of the reaction. The reaction temperature was increased to 150° C., then heating stopped and the reaction mass exothermed to about 184° C. This temperature was maintained until the reaction was completed, about 1 hour (3600 s). The product was allowed to cool to about 133° C. whereupon the nitrogen purge was discontinued, and 125 g (1.095 mole of 2-heptanone was added. The resultant product had a 511 EEW based on neat resin.

EXAMPLE 1

To a 1-liter glass flask equipped with a stirrer, thermometer, condenser, a method for a nitrogen purge and an electrical heating mantel was charged, in order, with 325 g (1.675 epoxy equivalents) of Epoxy Resin A, 85 g (0.467 epoxy equivalents) of Epoxy Resin C and 125.9 g (1.104 equiv.) of bisphenol A and heated to 90° C. whereupon 0.85 g (0.0014 mole) of Catalyst A was added. A nitrogen purge was maintained for the duration of the reaction. The reaction temperature was increased to 150° C., then heating stopped, and the reaction mass exothermed to about 188° C. This temperature was maintained until the reaction was completed, about 1.5 hours (5400 s). The product was allowed to cool to about 140° C. whereupon the nitrogen purge was discontinued, and 134 g (1.173 mole) of 2-heptanone was added. The resultant product had a 521 EEW based on neat resin, i.e. product without solvent.

EXAMPLE 2

To a 1-liter glass flask equipped with a stirrer, thermometer, condenser, a method for a nitrogen purge and an electrical heating mantel was charged, in order, with 295 g (1.532 epoxy equivalents) of Epoxy Resin B, 115 g (0.632 epoxy equivalents) of Epoxy Resin C and 126.8 g (1.112 equiv.) of bisphenol A and heated to 90° C. whereupon 0.85 g (0.0014 mole) of catalyst was added. A nitrogen purge was maintained for the duration of the reaction. The reaction temperature was increased to 150° C., then heating stopped, and the reaction mass exothermed to about 178° C. This temperature was maintained until the reaction was completed, about 1.5 hours (5400 s). The product was allowed to cool to about 135° C. whereupon the nitrogen purge was discontinued, and 135 g (1.182 mole) of 2-heptanone was added. The resultant product had a 526 EEW based on neat resin.

EXAMPLE 3

To a 1-liter glass flask equipped with a stirrer, thermometer, condenser, a method for a nitrogen purge and an electrical heating mantel was charged, in order, with 301 g (1.564 epoxy equivalents) of Epoxy Resin B, 89 g (0.506 epoxy equivalents) of Epoxy Resin D and 151.6 g (1.33 equiv.) of bisphenol A and heated to 90° C. whereupon 0.85 g (0.0014 mole) of Catalyst A was added. A nitrogen purge was maintained for the duration of the reaction. The reaction temperature was increased to 150° C., then heating stopped, and the reaction mass exothermed to about 189° C. This temperature was maintained until the reaction was completed, about 1.1 hours (3960 s). The product was allowed to cool to about 133° C. whereupon the nitrogen purge was discontinued, and 230.4 g (2.017 mole) of 2-heptanone was added. The resultant product had a 786 EEW based on neat resin.

COMPARATIVE EXPERIMENT B

To a 1-liter glass flask equipped with a stirrer, thermometer, condenser, a method for a nitrogen purge and an electrical heating mantel was charged, in order, with 240 g (1.247 epoxy equivalents) of Epoxy Resin) B, 85 g (0.453 epoxy equivalents) of Epoxy Resin E and 85 g (0.483 epoxy equivalents) of Epoxy Resin D and 126.5 g (1.11 equiv.) of bisphenol A and heated to 90° C. whereupon 0.85 g (0.0014 mole) of Catalyst A was added. A nitrogen purge was maintained for the duration of the reaction. The reaction temperature was increased to 150° C., then heating stopped, and the reaction mass exothermed to about 182° C. This temperature was maintained until the reaction was completed, about 1.25 hours (4500 s). The product was allowed to cool to about 136° C. whereupon the nitrogen purge was discontinued, and 134.1 g (1.173 mole) of 2-heptanone was added. The resultant product had a 520 EEW based on neat resin.

COMPARATIVE EXPERIMENT C

A 1-liter flask equipped with a stirrer, thermometer, condenser, a method for a nitrogen purge and an electrical heating mantel was charged in order, with 295 g (1.532 epoxy equivalents) of epoxy resin B, 115 g (0.650 epoxy equivalent) of epoxy resin F and 128.4 g (1.126 equiv.) of bisphenol A and heated to 90° C. whereupon 0.85 g (0.0014 mole) of catalyst was added. A nitrogen purge was maintained for the duration of the reaction. The reaction temperature was increased to 150° C., then heating stopped, and the reaction mass exothermed to about 189° C. The temperature was maintained until the reaction was completed, about 1 hour (3600 s). The product was cooled to about 136° C. whereupon the nitrogen purge was discontinued and 135 g (1.182 mole) of 2-heptanone was added. The resultant product had a 515 EEW based on neat resin.

EXAMPLE 4

A 1-liter flask equipped with a stirrer, thermometer, condenser, a method for a nitrogen purge and an electrical heating mantel was charged in order, with 295 g (1.532 epoxy equivalents) of epoxy resin B, 115 g (0.717 epoxy equivalent) of epoxy resin G and 134.7 g (1.182 equiv.) of bisphenol A and heated to 90° C. whereupon 0.85 g (0.0014 mole) of catalyst was added. A nitrogen purge was maintained for the duration of the reaction. The reaction temperature was increased to 150° C., then heating stopped, and the reaction mass exothermed to about 184° C. The temperature was maintained until the reaction was completed, about 1 hour (3600 s). The product was cooled to about 134° C. whereupon the nitrogen purge was discontinued and 136 g (1.191 mole) of 2-heptanone was added. The resultant product has a 524 EEW based on neat resin.

EXAMPLE 5

A 1-liter flask equipped with a stirrer, thermometer, condenser, a method for a nitrogen purge and an electrical heating mantel was charged in order, with 335 g (1.740 epoxy equivalents) of Epoxy Resin B, 75 g (0.398 epoxy equivalent) of Epoxy Resin H and 124.3 g (1.09 equiv.) of bisphenol A and heated to 90° C. whereupon 0.85 g (0.0014 mole) of catalyst was added. A nitrogen purge was maintained for the duration of the reaction. The reaction temperature was increased to 150° C., then heating stopped, and the reaction mass exothermed to about 180° C. The temperature was maintained until the reaction was completed, about 1 hour (3600 s). The product was cooled to about 134° C. whereupon the nitrogen purge was discontinued and 133.6 g (1.170 mole) of 2-heptanone was added. The resultant product had a 524 EEW based on neat resin.

COMPARATIVE EXPERIMENT D

A 1-liter glass flask equipped with a stirrer, thermometer, condenser, a method for a nitrogen purge and an electrical heating mantel was charged in order, with 295 g (1.532 epoxy equivalents) of Epoxy Resin B, 115 g (0.650 epoxy equivalents) of Epoxy Resin I and 128.5 g (1.128 equiv.) of bisphenol A and heated to 90° C. whereupon 0.84 g (0.0014 mole) of catalyst was added. A nitrogen purge was maintained for the duration of the reaction. The reaction temperature was increased to 150° C., then heating stopped and the reaction mass exothermed to about 180° C. This temperature was maintained until the reaction was completed, about 1 hour (3600 s). The product was allowed to cool to about 138° C. whereupon the nitrogen purge was discontinued and 134.6 g (1.178 mole) of 2-heptanone was added. The resultant product had a 520 EEW based on neat resin.

EXAMPLE 6

A 1-liter glass flask equipped with a stirrer, thermometer, condenser, a method for a nitrogen purge and an electrical heating mantel was charged in order, with 295 g (1.532 epoxy equivalents) of Epoxy Resin B, 115 g (0.651 epoxy equivalents) of Epoxy Resin J and 128.5 g (1.128 equiv.) of bisphenol A and heated to 90° C. whereupon 0.84 g (0.0014 mole) of catalyst was added. A nitrogen purge was maintained for the duration of the reaction. The reaction temperature was increased to 150° C., then heating stopped and the reaction mass exothermed to about 184° C. This temperature was maintained until the reaction was completed, about 1 hour (3600 s). The product was allowed to cool to about 133° C. whereupon the nitrogen purge was discontinued and 134.6 g (1.178 mole) of 2-heptanone was added. The resultant product had a 526 EEW based on neat resin.

EXAMPLE 7

A 1-liter glass flask equipped with a stirrer, thermometer, condenser, a method for a nitrogen purge and an electrical heating mantel was charged in order, with 295 g (1.532 epoxy equivalents) of Epoxy Resin B, 115 g (0.652 epoxy equivalents) of Epoxy Resin K and 128.6 g (1.128 equiv.) of bisphenol A and heated to 90° C. whereupon 0.84 g (0.0014 mole) of catalyst was added. A nitrogen purge was maintained for the duration of the reaction. The reaction temperature was increased to 150° C., then heating stopped and the reaction mass exothermed to about 183° C. This temperature was maintained until the reaction was completed, about 1 hour (3600 s). The product was allowed to cool to about 136° C. whereupon 134.6 g (1.178 mole) of 2-heptanone was added. The resultant product had a 524 EEW based on neat resin.

EXAMPLE 8

A 1-liter glass flask equipped with a stirrer, thermometer, condenser, a method for a nitrogen purge and an electrical heating mantel was charged in order, with 265.5 g (1.379 epoxy equivalents) of Epoxy Resin B, 115 g (0.653 epoxy equivalents) of Epoxy Resin D, 29.5 g (0.157 epoxy equivalents) of Epoxy Resin E and 129.1 g (1.132 equiv.) of bisphenol A and heated to 90° C. whereupon 0.84 g (0.0014 mole) of catalyst was added. A nitrogen purge was maintained for the duration of the reaction. The reaction temperature was increased to 150° C., then heating stopped and the reaction mass exothermed to about 184° C. This temperature was maintained until the reaction was completed, about 1 hour (3600 s). The product was allowed to cool to about 137° C. whereupon the nitrogen purge was discontinued and 134.8 g (1.180 mole) of 2-heptanone was added. The resultant product had a 523 EEW based on neat resin.

EXAMPLE 9

A 1-liter glass flask equipped with a stirrer, thermometer, condenser, a method for a nitrogen purge and an electrical heating mantel was charged in order, with 236 g (1.226 epoxy equivalents) of Epoxy Resin B, 115 g (0.653 epoxy equivalents) of Epoxy Resin D, 59 g (0.315 epoxy equivalents) of Epoxy Resin E and 129.4 g (1.136 equiv.) of bisphenol A and heated to 90° C. whereupon 0.84 g (0.0014 mole) of catalyst was added. A nitrogen purge was maintained for the duration of the reaction. The reaction temperature was increased to 150° C., the heating stopped and the reaction mass exothermed to about 185° C. This temperature was maintained until the reaction was completed, about 1 hour (3600 s). The product was allowed to cool to about 137° C. whereupon the nitrogen purge was discontinued and 134.8 g (1.180 mole) of 2-heptanone was added. The resultant product had a 519 EEW based on neat resin.

COMPARATIVE EXPERIMENT E

A 1-liter glass flask equipped with a stirrer, thermometer, condenser, a method for a nitrogen purge and an electrical heating mantel was charged in order, with 221.25 g (1.149 epoxy equivalent) of Epoxy Resin B, 115 g (0.653 epoxy equivalent) of Epoxy Resin D, 73.75 g (0.393 epoxy equivalent) of Epoxy Resin E and 129.5 g (1.136 equiv.) of bisphenol A and heated to 90° C. whereupon 0.84 g (0.0014 mole) of catalyst was added. A nitrogen purge was maintained for the duration of the reaction. The reaction temperature was increased to 150° C., then heating stopped and the reaction mass exothermed to about 183° C. This temperature was maintained until the reaction was completed, about 1 hour (3600 s). The product was allowed to cool to about 134° C. whereupon the nitrogen purge was discontinued and 134.9 g (1.181 mole of 2-heptanone was added. The resultant product had a 521 EEW based on neat resin.

The resins prepared in the above Examples and Comparative Experiments were formulated into coatings and tested for chip resistance. The results are given in the following Table I.

TABLE I

| SAMPLE NO. | EPOXY RESIN | FORMULATION | CHIP RATING |
|---|---|---|---|
| A | Comparative Experiment A | A | 6+ |
| B | Example 2 | A | 8+ |
| C | Comparative Experiment A | B | 7 |
| D | Comparative Experiment B | B | 6 |
| E | Example 2 | B | 8 |
| F | Comparative Experiment C | B | 6 |
| G | Example 4 | B | 8− |
| H | Example 5 | B | 8− |
| I | Comparative Experiment D | B | 6+ |
| J | Example 6 | B | 7+ |
| K | Example 7 | B | 8 |
| L | Example 8 | B | 8 |
| M | Example 9 | B | 8 |
| N | Comparative Experiment E | B | 6+ |
| O | Example 2 | C | 6 |
| P | Example 2 | D | 7+ |

TABLE I-continued

| SAMPLE NO. | EPOXY RESIN | FORMULATION | CHIP RATING |
| --- | --- | --- | --- |
| Q | Comparative Experiment A | C | 6 |
| R | Comparative Experiment A | D | 7 |

EXAMPLE 10

A 0.5-liter glass flask equipped with a stirrer, thermometer, condenser, a method for a nitrogen purge and an electrical heating mantel was charged in order, with 222.8 g (1.166 epoxy equivalents) of Epoxy Resin L, 42 g (0.233 epoxy equivalent) of Epoxy Resin M and 97.7 g (0.857 equiv.) of Bisphenol A and heated to 90° C. whereupon 0.84 g (0.0014 mole) of catalyst was added. A nitrogen purge was maintained for the duration of the reaction. The reaction temperature was increased to 150° C., then heating stopped and the reaction mass exothermed to about 174° C. This temperature was maintained until the reaction was completed, about 1 hour (3600 s). The product was allowed to cool to about 130° C. whereupon 90.6 g (0.793 mole) of 2-heptanone was added. The resultant product had a 683 EEW based on neat resin.

EXAMPLE 11

A 0.5-liter glass flask equipped with a stirrer, thermometer, condenser, a method for a nitrogen purge and an electrical heating mantel was charged in order, with 222.8 g (1.166 epoxy equivalents) of Epoxy Resin L, 42 g (0.233 epoxy equivalent) of Epoxy Resin M and 39.9 g (0.35 equiv.) of Bisphenol A and heated to 90° C. whereupon 0.84 g (0.0014 mole) of catalyst was added. A nitrogen purge was maintained for the duration of the reaction. The reaction temperature was increased to 150° C., then heating stopped and the reaction mass exothermed to about 153° C. The temperature was increased to 174° C. and maintained until the reaction was completed, about 1 hour (3600 s). The product was allowed to cool to about 132° C. whereupon 76.2 g (0.667 mole) of 2-heptanone was added. The resultant product had a 299 EEW based on neat resin.

EXAMPLE 12

A 0.5-liter glass flask equipped with a stirrer, thermometer, condenser, a method for a nitrogen purge and an electrical heating mantel was charged in order, with 204.28 g (1.069 epoxy equiv.) of Epoxy Resin L, 57.62 g (0.320 epoxy equiv.) of Epoxy Resin M and 114 g (1.0 equiv.) of Bisphenol A and heated to 90° C. whereupon 0.84 g (0.0014 mole) of catalyst was added. A nitrogen purge was maintained for the duration of the reaction. The reaction temperature was increased to 15020 C., then heating stopped and the reaction mass exothermed to about 172° C. This temperature was maintained until the reaction was completed, about 1 hour (3600 s). The product was allowed to cool to about 130° C. whereupon 94.0 g (0.823 mole) of 2-heptanone was added. The resultant product had a 956 EEW based on neat resin.

EXAMPLE 13

A 0.5-liter glass flask equipped with a stirrer, thermometer, condenser, a method for a nitrogen purge and an electrical heating mantel was charged in order, with 203.1 g (1.063 epoxy equiv.) of Epoxy Resin L, 57.4 g (0.319 epoxy equiv.) of Epoxy Resin M and 39.4 g (0.346 equiv.) of Bisphenol A and heated to 90° C. whereupon 0.84 g (0.0014 mole) of catalyst was added. A nitrogen purge was maintained for the duration of the reaction. The reaction temperature was increased to 150° C., then heating stopped and the reaction mass exothermed to about 174° C. The temperature was maintained until the reaction was completed, about 1 hour (3600 s). The product was allowed to cool to about 132° C. whereupon 74.9 g (0.656 mole) of 2-heptanone was added. The resultant product had a 290 EEW based on neat resin.

COMPARATIVE EXPERIMENT F

A 0.5-liter glass flask equipped with a stirrer, thermometer, condenser, a method for a nitrogen purge and an electrical heating mantel was charged in order, with 267.4 g (1.400 epoxy equiv.) of Epoxy Resin L and 114 g (1.00 equiv.) of Bisphenol A and heated to 90° C. whereupon 0.84 g (0.0014 mole) of catalyst was added. A nitrogen purge was maintained for the duration of the reaction. The reaction temperature was increased to 150° C., then heating stopped and the reaction mass exothermed to about 177° C. This temperature was maintained until the reaction was completed, about 1 hour (3600 s). The product was allowed to cool to about 142° C. whereupon 95.4 g (0.84 mole) of 2-heptanone was added. The resultant product had a 966 EEW based on neat resin.

COMPARATIVE EXPERIMENT G

A 0.5-liter glass flask equipped with a stirrer, thermometer, condenser, a method for a nitrogen purge and an electrical heating mantel was charged in order, with 267.4 g (1.400 epoxy equiv.) of Epoxy Resin L and 39.9 g (0.350 equiv.) of Bisphenol A and heated to 90° C. whereupon 0.84 g (0.0014 mole) of catalyst was added. A nitrogen purge was maintained for the duration of the reaction. The reaction temperature was increased to 150° C., then heating stopped and the reaction mass exothermed to about 173° C. The temperature was increased to 175° C. and maintained until the reaction was completed, about 1 hour (3600 s). The product was allowed to cool to about 140° C. whereupon 76.8 g (0.672 mole) of 2-heptanone was added. The resultant product had a 298 EEW based on neat resin.

COMPARATIVE EXPERIMENT H

A 0.5-liter glass flask equipped with a stirrer, thermometer, condenser, a method for a nitrogen purge and an electrical heating mantel was charged in order, with 267.4 g (1.486 epoxy equiv.) of Epoxy Resin M and 42.3 g (0.371 equiv.) of Bisphenol A and heated to 90° C. whereupon 0.84 g (0.0014 mole) of catalyst was added. A nitrogen purge was maintained for the duration of the reaction. The reaction temperature was increased to 150° C., then heating stopped and the reaction mass exothermed to 165° C. whereupon the reaction mass gelled to a hard insoluble mass and the reaction terminated.

Each of the above Examples 10–13 and Comparative Experiments F and G were employed in coating formulations and tested for stone chip resistance, resistance to methyl ethyl ketone (MEK), glacial acetic acid and pencil hardness. The results are given in the following Tables II and III. The resin from Comparative Experiment H was not tested because it was a gel and therefore not useful.

TABLE II

| SAMPLE NO. | EPOXY RESIN | FORMULATION | EPOXY TO HYDROXYL EQUIV. RATIO | ALIPHATIC EPOXY TO NOVOLAC EPOXY EQUIV. RATIO | STONE CHIP RATING | PENCIL HARDNESS |
|---|---|---|---|---|---|---|
| A | Comp. Expt. F | B | 1.4:1 | 1:0 | 7 | H |
| B | Comp. Expt. G | B | 4:1 | 1:0 | 7+ | F |
| C | Comp. Expt. H | Product was a gel and not tested | 4:1 | 0:1 | | |
| D | Example 10 | B | 1.4:1 | 1:0.2 | 7 | 4H |
| E | Example 11 | B | 4:1 | 1:0.2 | 7+ | 2H |
| F | Example 12 | B | 1.4:1 | 1:0.3 | 7− | 5H |
| G | Example 13 | B | 4:1 | 1:0.3 | 7− | 3H |

TABLE III

| SAMPLE NO. | EPOXY RESIN | FORMULATION | EPOXY TO HYDROXYL EQUIV. RATIO | ALIPHATIC EPOXY TO NOVOLAC EPOXY EQUIV. RATIO | MEK DOUBLE Rubs | GLACIAL ACETIC ACID SPOT TEST SECONDS |
|---|---|---|---|---|---|---|
| A | Comp. Expt. F | E | 1.4:1 | 1:0 | 63 | 924 |
| B | Comp. Expt. G | E | 4:1 | 1:0 | 33 | 720 |
| C | Comp. Expt. H | — | 4:1 | 0:1 produt was a gel and not tested | | |
| D | Example 10 | E | 1.4:1 | 1:0.2 | 103 | 1578 |
| E | Example 11 | E | 4:1 | 1:0.2 | 46 | 960 |
| F | Example 12 | E | 1.4:1 | 1:0.3 | 146 | 2598 |
| G | Example 13 | E | 4:1 | 1:0.3 | 45 | 1224 |

We claim:

1. An advanced epoxy resin composition comprising a product resulting from reacting (A) a mixture containing (1) at least one polyglycidyl ether of a material having at least two aliphatic hydroxyl groups per molecule, (2) at least one epoxy resin having an average of from about 2.6 to about 6 glycidyl ether groups per molecule attached to one or more aromatic rings and optionally (3) one or more glycidyl ethers of a dihydric phenol; with (B) at least one dihydric phenol in the presence of a suitable quantity of a suitable catalyst; and wherein (i) components (A) and (B) are present in quantities which provide an epoxy to phenolic hydroxyl ratio of from about 1.4:1 to about 4:1, with the proviso that all calculations are on the basis that there are no substituent groups other than hydrogen, hydroxyl or glycidyl ether groups attached to any aromatic rings of any of the components even when such groups are actually present and (ii) wherein the number of epoxy equivalents contributed by component (A-3) to the number of epoxy equivalents contributed by component (A-2) to the number of epoxy equivalents contributed by component (A-1) is from abut 0:0.05:1 to about 0.3:0.6:1.

2. An advanced epoxy resin composition of claim 1 wherein (i) when component (A-2) has an average epoxy functionality of from about 2.6 to about 3, the ratio of epoxy equivalents contributed by component (A-3) to epoxy equivalents contributed by component (A-2) to epoxy equivalents contributed by component (A-1) is from about 0:0.2:1 to about 0.3:0.45:1 and the ratio of total epoxy equivalents contributed by component (A) to phenolic hydroxyl equivalents contributed by component (B) is from about 1.4:1 to about 4:1;

(ii) when component (A-2) has an average epoxide functionality of from about >3 to about 3.6, the ratio of epoxy equivalents contributed by component (A-3) to epoxy equivalents contributed by component (A-2) to epoxy equivalents contributed by component (A-1) is from about 0:0.12:1 to about 0.3:0.31:1 and the ratio of total epoxy equivalents contributed by component (A) to phenolic hydroxyl equivalents contributed by component (B) is from about 1.4:1 to about 4:1; and (iii) when component (A-2) has an average epoxide functionality of from about >3.6 to about 6, the ratio of epoxy equivalents contributed by component (A-3) to epoxy equivalents contributed by component (A-2) to epoxy equivalents contributed by component (A-1) is from about 0:0.05:1 to about 0.3:0.1:1 and the ratio of total epoxy equivalents contributed by component (A) to phenolic hydroxyl equivalents contributed by component (B) is from about 1.4:1 to about 5:1.

3. An advanced epoxy resin composition of claim 1 wherein (i) when component (A-2) has an average epoxide functionality of from about 2.6 to about 3, the ratio of epoxy equivalents contributed by component (A-3) to epoxy equivalents contributed by component (A-2) to epoxy equivalents contributed by component (A-1) is from about 0:0.3:1 to about 0.15:0.56:1 and the ratio of total epoxy equivalents contributed by component (A) to phenolic hydroxyl equivalents contributed by component (B) is from about 1.59:1 to about 3:1;

(ii) when component (A-2) has an average epoxide functionality of from about >3 to about 3.6, the ratio of epoxy equivalents contributed by component (A-3) to epoxy equivalents contributed by component (A-2) to epoxy equivalents contributed by component (A-1) is from about 0:0.2:1 to about 0.15:0.41:1 and the ratio of total epoxy equivalents contributed by component (A) to phenolic hydroxyl equivalents contributed by component (B) is from about 1.59:1 to about 3:1; and (iii) when component (A-2) has an average epoxide functionality of from about >3.6 to about 6, the ratio of epoxy equivalents contributed by component (A-3) to epoxy equivalents contributed by component (A-2) to epoxy equivalents contributed by component (A-1) is from about 0:0.08:1 to about 0.15:0.12:1 and the ratio of total epoxy equivalents contributed by component (A) to phenolic hydroxyl equivalents contributed by component (B) is from about 1.59:1 to about 4:1.

4. An advanced epoxy resin composition of claim 1 wherein
(i) when component (A-2) has an average epoxy functionality of from about 2.6 to about 3, the ratio of epoxy equivalents contributed by component (A-3) to epoxy equivalents contributed by component (A-2) to epoxy equivalents contributed by component (A-1) is from about 0:0.4:1 to about 0.1:0.58:1 and the ratio of total epoxy equivalents contributed by component (A) to phenolic hydroxyl equivalents contributed by component (B) is from about 1.9:1 to about 2.5:1;
(ii) when component (A-2) has an average epoxide functionality of from about >3 to about 3.6, the ratio of epoxy equivalents contributed by component (A-3) to epoxy equivalents contributed by component (A-2) to epoxy equivalents contributed by component (A-1) is from about 0:0.3:1 to about 0.1:0.43:1 and the ratio of total epoxy equivalents contributed by component (A) to phenolic hydroxyl equivalents contributed by component (B) is from about 1.9:1 to about 2.5:1; and
(iii) when component (A-2) has an average epoxide functionality of from about >3.6 to about 6, the ratio of epoxy equivalents contributed by component (A-3) to epoxy equivalents contributed by component (A-2) to epoxy equivalents contributed by component (A-1) is from about 0:0.1:1 to about 0.1:0.13:1 and the ratio of total epoxy equivalents contributed by component (A) to phenolic hydroxyl equivalents contributed by component (B) is from about 1.9:1 to about 3:1.

5. An advanced epoxy resin of claim 1 wherein
(i) component (A-1) is a diglycidyl ether of a polyoxypropylene glycol;
(ii) component (A-2) is an epoxy novolac resin or a triglycidyl ether of trisphenol methane;
(iii) component (A-3), when present, is a glycidyl ether of bisphenol A; and
(iv) component (B) is a bisphenol.

6. An advanced epoxy resin of claim 5 wherein
(i) component (A-2) is a phenol-formaldehyde epoxy novolac resin and
(ii) component (B) is bisphenol A.

7. An advanced epoxy resin of claim 2 wherein
(i) component (A-1) is a diglycidyl ether of a polyoxypropylene glycol;
(ii) component (A-2) is an epoxy novolac resin or a triglycidyl ether of trisphenol methane;
(iii) component (A-3), when present, is a glycidyl ether of bisphenol A; and
(iv) component (B) is a bisphenol.

8. An advanced epoxy resin of claim 7 wherein
(i) component (A-2) is a phenol-formaldehyde epoxy novolac resin and
(ii) component (B) is bisphenol A.

9. An advanced epoxy resin of claim 3 wherein
(i) component (A-1) is a diglycidyl ether of a polyoxypropylene glycol;
(ii) component (A-2) is an epoxy novolac resin or a triglycidyl ether of trisphenol methane;
(iii) component (A-3), when present, is a glycidyl ether of bisphenol A; and
(iv) component (B) is a bisphenol.

10. An advanced epoxy resin of claim 9 wherein
(i) component (A-2) is a phenol-formaldehyde epoxy novolac resin and
(ii) component (B) is bisphenol A.

11. An advanced epoxy resin of claim 4 wherein
(i) component (A-1) is a diglycidyl ether of a polyoxypropylene glycol;
(ii) component (A-2) is an epoxy novolac resin or a triglycidyl ether of trisphenol methane;
(iii) component (A-3), when present, is a glycidyl ether of bisphenol A; and
(iv) component (B) is a bisphenol.

12. An advanced epoxy resin of claim 11 wherein
(i) component (A-2) is a phenol-formaldehyde epoxy novolac resin and
(ii) component (B) is bisphenol A.

13. A coating composition comprising an advanced epoxy resin of claims 1, 2, 3, 4, 5, 6, 7, 8, 9, 10, 11 or 12 and a curing quantity of one or more curing agents and/or curing catalysts therefor.

14. A product resulting from curing a mixture comprising an advanced epoxy resin of claims 1, 2, 3, 4, 5, 6, 7, 8, 9, 10, 11 or 12 and a curing quantity of at least one suitable curing agent therefor.

15. A product of claim 14 wherein said curing agent is selected from one or more blocked polyisocyanates or mixtures of one or more blocked polyisocyanates and at least one guanidine material.

16. A product of claim 15 wherein said blocked polyisocyanates are selected from ketoxime blocked polyisocyanates.

17. An article comprising a substrate coated with a coating composition of claim 13.

18. In an article comprising a substrate coated with (1) a coating layer, (2) a chip resistant coating layer, (3) optionally a primer-surfacer coating layer and (4) a top coating layer; the improvement which comprises employing as said chip coating layer, a coating composition of claim 13.

* * * * *